United States Patent [19]

Kopytko

[11] Patent Number: 5,717,020
[45] Date of Patent: Feb. 10, 1998

[54] FILM OR MOLDED ARTICLE OF A THERMOPLASTIC WITH A TERPOLYMER COMPONENT

[75] Inventor: Walter Kopytko, Waldkraiburg, Germany

[73] Assignee: J.H. Benecke AG, Hanover, Germany

[21] Appl. No.: 827,629

[22] Filed: Apr. 10, 1997

Related U.S. Application Data

[63] Continuation of Ser. No. 510,579, Aug. 2, 1995, abandoned, which is a continuation of Ser. No. 42,116, Apr. 2, 1993, abandoned.

[30] Foreign Application Priority Data

Apr. 4, 1992 [DE] Germany .................. 42 11 416.0

[51] Int. Cl.$^6$ .................. C08L 23/04; C08L 23/10; C08L 23/16; C08K 3/00
[52] U.S. Cl. .................. 524/425; 524/430; 524/444; 524/447; 524/451; 524/528; 525/125; 525/186; 525/190; 525/222; 525/240
[58] Field of Search .................. 525/240, 222, 525/190, 125, 186; 524/528, 425, 447, 451, 430, 444

[56] References Cited

U.S. PATENT DOCUMENTS

| | | | |
|---|---|---|---|
| 4,140,732 | 2/1979 | Schnetger et al. | 260/876 |
| 4,212,787 | 7/1980 | Matsuda et al. | 525/240 |
| 4,607,074 | 8/1986 | Hazelton et al. | 525/240 |
| 4,740,335 | 4/1988 | Scholz et al. | 264/22 |
| 4,751,321 | 6/1988 | Mann et al. | 558/134 |
| 4,801,651 | 1/1989 | Komatsu et al. | 525/197 |
| 4,877,827 | 10/1989 | van der Groep | 525/98 |
| 4,889,888 | 12/1989 | Bassi et al. | 525/99 |
| 4,894,408 | 1/1990 | Hazelton et al. | 525/197 |
| 4,917,944 | 4/1990 | Breitscheidel et al. | 428/308.4 |
| 4,985,502 | 1/1991 | Izumi et al. | 525/240 |
| 5,001,195 | 3/1991 | van der Groep | 525/222 |
| 5,051,478 | 9/1991 | Puydak et al. | 525/195 |

FOREIGN PATENT DOCUMENTS

| | | |
|---|---|---|
| 143131 | 6/1985 | European Pat. Off. . |
| 0 203 399 | 12/1986 | European Pat. Off. . |
| 0213254 | 3/1987 | European Pat. Off. . |
| 0248543 | 9/1987 | European Pat. Off. . |
| 0256724 | 2/1988 | European Pat. Off. . |
| 0312664 | 4/1989 | European Pat. Off. . |
| 0376213 | 4/1990 | European Pat. Off. . |
| 2642090 | 3/1978 | Germany . |

*Primary Examiner*—Donald R. Wilson
*Attorney, Agent, or Firm*—Margaret B. Kelley; Rogers & Wells

[57] ABSTRACT

A film and molded article are described, consisting of a thermoplastic based on a partially crystalline ethylene-propylene-diene terpolymer, a homo- and/or copolymer of an alkene, and a polymeric modifying agent, wherein the plastic possibly contains stabilizers, fillers, lubricants, colorants, and flame retardants, as well as conventional additives. This film is characterized by the fact that the thermoplastic is a partially crystallized random ethylene-propylene-diene terpolymer that is about 70–95% crosslinked, that the thermoplastic comprises an elastomer containing approximately 30 to 70 parts by weight of a homo- and/or copolymer of ethylene and/or propylene per 70 to 30 parts by weight of the partially crystalline ethylene-propylene-diene terpolymer, and that the thermoplastic contains at least approximately 5 wt % of a partially crystalline and/or amorphous polymeric modifying agent, wherein the weight-percent total of ethylene and propylene in the partially crystalline ethylene-propylene-diene terpolymer is between approximately 15 and 91 wt %. During processing to form molded articles, the film has improved properties such as an improved embossing strength, in particular. The film and the molded articles have a good weathering stability.

15 Claims, No Drawings

FILM OR MOLDED ARTICLE OF A THERMOPLASTIC WITH A TERPOLYMER COMPONENT

This is a continuation, of application Ser. No. 08/510,579, filed Aug. 2, 1995 now abandoned, which is a continuation, of application Ser. No. 08/042,116, filed Apr. 2, 1993, now abandoned.

BACKGROUND OF THE INVENTION

The invention pertains to a film or a molded article of a thermoplastic elastomer.

Plastic films of the above-described type, as well as molded and composite parts produced from them, are discussed in DE-A-40 15 748. The plastic part of such films contains a) 55 to 95 parts by weight of at least one thermoplastic olefin elastomer or elastomer mixture consisting of a heterophase polypropylene block copolymer with the proportion of the ethylene-propylene copolymer being 15 to 50 wt % (based on 100 parts by weight of the ethylene-propylene block copolymer) and b) 45 to 5 parts by weight of other polymers, especially in the form of olefins as well as styrene-containing polymers. The total amount of ethylene and propylene in the block copolymer must be 10 to 50 wt %. Complete replacement of the block copolymer by a random copolymer is excluded. The block copolymer should, however, be able to be replaced by up to 80 wt %, preferably up to 35 wt %, of an ethylene-propylene random copolymer or a block copolymer with an ethylene content of 2 to 10 wt %. With these known plastic films, improved properties, especially an improved thermoforming ability as well as an improved embossing strength, should be attainable. In addition, these films are said to be flexible and to fulfill the specifications of the automobile industry, e.g., with respect to ageing and fogging properties. However, in testing, it has been shown that these films need improvement with respect to their thermoforming ability as well as embossing strength.

It is therefore the goal of the invention to improve the above described films or molded article so that, in further processing after the thermoforming process, the film has an improved thermoforming capacity as well as embossing strength, with better properties such as an improved flexibility being imparted to the molded articles.

SUMMARY OF THE INVENTION

According to the invention, the above goal is attained by the use of a thermoplastic elastomer which contains a partially crystalline, random ethylene-propylene-diene terpolymer that is at least 30% crosslinked. The thermoplastic elastomer comprises approximately 30 to 70 parts by weight of a homo- and/or copolymer of ethylene and/or propylene per 70 to 30 parts by weight of the partially crystalline ethylene-propylene-diene terpolymer. The thermoplastic elastomer also contains at least approximately 5 wt. %, preferably approximately 10 wt % of a partially crystalline and/or amorphous polymeric modifying agent. The weight-percent total of ethylene and propylene in the partially crystalline ethylene-propylene-diene terpolymer is between 15 and 91 wt %.

In the sense of the invention, the concept, "thermoplastic elastomer" is intended to include plastic mixtures, polymer blends, polymer alloys, or graft copolymers and the like. Thus, this concept should be extensively understood in the area of plastics technology.

In keeping with this, the essential component of the thermoplastic elastomer of the invention is a partially crystalline ethylene-propylene-diene terpolymer, and therefore no block copolymer. This random terpolymer is at least 30% crosslinked. The terpolymer is preferably 50 to 100%, especially 70 to 95%, crosslinked in the thermoplastic elastomer. The initial degree of crystallization is preferably 20 to 60%, wherein it decreases with increased crosslinking. For the "diene" components of the terpolymer, which are substantially responsible for the crosslinking, dicyclopentadiene, 1,4-hexadiene, and/or 5-ethylidene-2-norbornene are preferred.

The crosslinking of the terpolymer is typically carried out when the terpolymer is mixed with the homo- and/or copolymer of ethylene and/or propylene. In this way, the terpolymer can be crosslinked, distributed, and dispersed in conventional mixing equipment such as internal mixers, biaxial extruders, and the like under suitable temperature, shear, and pressure conditions. For example, an ethylene-propylene-diene rubber (EPDM) and an ethylene-propylene copolymer by adding suitable crosslinking agents such as a peroxide, an epoxide, a silane compound, and the like. In this way, the additives discussed below can be mixed in at the same time. It can be determined by simple experiments whether the degree of crosslinking is at least 30%. The degree of crosslinking can, for example, be determined treating the thermoplastic elastomer with a solvent. The crosslinked terpolymer remains as a gel from whose amount conclusions on the degree of crosslinking can be drawn. The determination of the degree of crosslinking can also be done according to DIN 16892.

The total weight percent of the ethylene and propylene in the random ethylene-propylene-diene terpolymer is between approximately 15 and 91 wt %, preferably between approximately 52 and 91 wt %. In particular, the ethylene content of the random terpolymer is at least approximately 65 wt %.

Within the framework of the invention, approximately 30 to 70 parts by weight of the homo- and/or copolymer of ethylene and/or propylene are used per 70 to 30 parts by weight of the random ethylene-propylene-diene terpolymer. Preferably approximately 40 to 70 parts by weight of the ethylene-propylene copolymer are used per approximately 60 to 30 parts by weight of the ethylene-propylene-diene terpolymer.

If an ethylene-propylene copolymer is used for the purpose of the invention, then this copolymer preferably contains approximately 5 to 20 wt % of ethylene. It is preferred that the ethylene-propylene copolymer have a narrow molecular weight distribution, with a nonuniformity U of less than approximately 6, especially less than 4. It is especially advantageous to also use an ethylene copolymer that contains approximately 5 to 20 wt % of octene or butene as a comonomer. It is advantageous if the homo- and/or copolymer of ethylene or propylene has a melt index MFI (230/2.16) of approximately 0.5 to 10 g/10 min, especially approximately 0.8 to 2.5 g/10 min, during calendering, and has a melt index of at least approximately 0.8 g/10 min, especially 2.5 to 25 g/10 min, during extrusion.

Thermoplastic elastomers which contain both the partially crystalline random ethylene-propylene-diene terpolymer as well as the homo- and/or copolymer of ethylene and/or are already commercially available. They are supplied with and/or without high-molecular-weight plasticizing components. These include the commercial products MILASTOMER® (ethylene-propylene-dicyclopentadiene or -ethylidine-norbornene terpolymers marketed by Mitsui, Japan), KELPROX® (ethylene-propylene-ethylidenenorbornene polymer marketed by DSM, Netherlands), and Santoprene® (ethylene-propylene-ethylidine-norbornene polymer, marketed by AES, a joint venture of Exxon and Monsanto).

The third essential component of the thermoplastic elastomer is a partially crystalline and/or amorphous polymeric modifying agent which is contained therein in an amount of at least approximately 5 wt %, especially between approximately 8 to 80 wt %. The crystallinity of this modifying agent is between approximately 0% and 40%, preferably between approximately 5% and 25%.

DESCRIPTION OF THE PREFERRED EMBODIMENTS

As the partially crystalline and/or amorphous modifying agent, a styrene copolymer is preferably used, especially an elastomer-modified styrene-acrylonitrile (SAN) copolymer, an ethylene-acrylic acid and/or ethylene-acrylic acid ester copolymer, propylene-acrylic acid and/or propylene-acrylic acid ester copolymer, a low-density and/or a high-density polyethylene, an ethylene-vinyl acetate copolymer, an ethylene-glycidyl methacrylate copolymer, a polyurethane, a polycaprolactone, a polyetheramide, a poly(aliphatic imide) copolymer, and/or a styrene block copolymer in the form of a styrene-hydrogenated diene or styrene-diene block, di-block, or tri-block copolymer, e.g., a styrene-ethylene-propylene block copolymer (SEP), a styrene-ethylene-butadiene-styrene block copolymer (SEBS), a styrene-ethylene-butadiene block copolymer (SEB), and/or a styrene-butadiene-styrene block copolymer (SBS). The elastomer-modified SAN copolymer is preferably an acrylonitrile-ethylene-propylene-diene-styrene copolymer (A-EPDM-S), an acrylonitrile-styrene-acrylic acid ester copolymer (ASA), and/or a poly(acrylonitrile-butadiene-styrene) (ABS).

The modifying agent has an effect on the following properties: it serves to control the melting strength and viscosity, toughness, ease of calendering, ease of extrusion, and similar properties. Moreover, it can hinder or prevent the tendency of the films or the finished parts to crystallize, which affects the thermoforming properties and the embossing strength in a positive sense. Modifiers can also positively affect the miscibility or improve the wettability and adhesion. In some cases, modifiers can cause internal and external plasticizing or stiffening of the matrix polymers, or they can affect these processes in a desirable manner.

In most practical applications, the thermoplastic elastomers of the invention will contain fillers. The proportion of fillers is advantageously approximately 8 to 28 wt %. All conventional fillers can be used, especially in the form of potassium aluminum silicate, talc, chalk, kaolin, metal oxides especially titanium dioxide, and/or carbon black. Finally, additional conventional additives can be used, especially stabilizers such as oxidation inhibitors and heat stabilizers, e.g., sterically hindered phenols, hydroquinones, or substituted derivatives thereof; phosphites, phosphonites, and/or mixtures thereof; UV stabilizers, e.g., various low-molecular-weight and high-molecular-weight resorcinols, salicylates, benzotriazoles, and benzophenones, and mixtures thereof, and the like; lubricants such as $C_{12}$ to $C_{26}$ fatty acids, fatty alcohols, fatty acid esters, fatty acids amides and/or mixtures thereof, and the like; as well as colorants such as organic dyes and pigments, e.g., titanium dioxide, phthalocyanines, or carbon black; and flame retardants such as ammonium polyphosphate, zinc borate, and the like.

The plastic of the invention can be processed in many ways, such as by injection molding, extrusion, and calendering processes. The film of the invention can also be processed by thermoforming, air-pressing, and membrane-pressing processes (mixing of the starting materials). Thermoformed molded parts or composites of the films of the invention can, for example, be used with special advantage for airplanes, automotive vehicles, for vehicle interior finishing or finished parts, preferably switch panels or control boards, columns, vehicle side finishing, door finishing, shelves, and exterior finishing. The film of the invention can also be glued, using conventional adhesive technology, to various substrates. It can be combined with additional layers such as protective layers. Finally, adhesive layers can also be applied to the back, possibly also laminated or bonded with suitable foam layers. In all further processing, especially in the thermoforming process, it has been shown that the film or molded article of the invention is especially suitable and is characterized by a superior embossing strength. In addition, the film and molded articles of the invention are characterized by weathering stability.

The film of the invention also has other valuable properties such as an advantageous hardness, good initial tear elongation, as well as good residual tear elongation after heat ageing and UV irradiation.

The invention is described in more detail on the basis of the following examples.

EXAMPLES 1 TO 5

In Table I below, the recipes for the various examples are given. Based on these recipes, films of 1.2-mm thickness were prepared in a 4-roller calender. The properties of these films are described in Table I below. Table II below gives more information on the exact composition of the various copolymers.

The numerical values in Table I in connection with the different components of the examples are in weight percent.

Table II explains the abbreviations used in Table I, in which the numerical values as parts in %.

TABLE I

| Weight % | 1 | 2 | 3 | 4 | 5 |
|---|---|---|---|---|---|
| Thermoplastic Elastomer (TPE)-1 | 50 | — | 49 | 65 | 80 |
| Thermoplastic Elastomer (TPE)-2 | — | 50 | — | — | — |
| Random-Polypropylene-1 | 30 | 30 | — | — | — |
| Homo-PP | — | — | — | 10 | — |
| LLDPE (Butene) | 15 | 15 | — | — | — |
| LLDPE (Octene-1) | — | — | 15 | 6 | — |
| Modifying agents | | | | | |
| ASA | 15 | 15 | — | — | — |
| AES | — | — | 30 | 15 | — |
| SEP-Diblock 29/71 | 4 | 4 | — | 4 | — |
| SEBS-Block 29/91 | — | — | — | — | 20 |
| EVA-Terpolymer | — | — | 6 | — | — |
| Additive | | | | | |
| (parts by weight) | 1 | 2 | 3 | 4 | 5 |
| Filler (K-A-S) | 10 | 20 | 10 | 10 | 20 |
| Filler Carbon black | 1.4 | 1.4 | 1.4 | 1.4 | 1.4 |
| Flame retardant-Mg(OH)$_2$ | 10 | — | — | — | — |
| Lubricant - Calcium stearate | 0.3 | 0.3 | 0.3 | 0.3 | 0.3 |
| Stabilizer-Irganox 1010 | 0.12 | 0.12 | 0.12 | 0.12 | 0.12 |
| Stabilizer-Irgaphos 168 | 0.08 | 0.08 | 0.08 | 0.08 | 0.08 |
| Stabilizer-Tinvrin 770 | 0.12 | 0.12 | 0.12 | 0.12 | 0.12 |
| Stabilizer-Chimosorb 944 | 0.12 | 0.12 | 0.12 | 0.12 | 0.12 |
| Properties | | | | | |
| Hardness (Shore D-15 sec) DIN 53505 | 44 | 34 | 28 | 29 | 20 |
| Initial Tear Elongation | 631 | 750 | 285 | 561 | 418 |

TABLE I-continued

| Weight % | 1 | 2 | 3 | 4 | 5 |
|---|---|---|---|---|---|
| DIN 52910 Residual Tear Elongation after: | | | | | |
| a) Heat Ageing (500 h/120° C.) | 504 | 600 | 230 | 530 | 330 |
| b) UV-Irradiation 480 h (corresponding DIN 75220) | 440 | 525 | 204 | 400 | 292 |

TABLE II

| Parts in % | Ethylene | Propylene | Dicyclopentadiene | Octene-1 | Butene |
|---|---|---|---|---|---|
| Ethylene-propylene-dicyclopentadiene (A) | 45 | 23 | 12 | — | — |
| Random polypropylene copolymer (A1) | 8 | 92 | — | — | — |
| Random polyethylene copolymer (A3) | 94 | — | — | 6 | — |
| Thermoplastic Elastomer (TPE)-1(A5) | A = 53% | A1 = 28% | A4 = 19% | — | — |
| Thermoplastic Elastomer (TPE)-2(A6) | A = 56% | A1 = 20% | A4 = 24% | — | — |
| Random polyethylene copolymer (A4) | 92 | — | — | — | 8 |
| Homo-polypropylene | — | 100 | — | — | — |
| Butyl acrylate modif. SAN | — | — | — | — | — |
| EPDM-rubber modified SAN | — | — | — | — | — |
| EVA-carbon monoxide terpolymer | 62 | — | — | — | — |
| SEP block copolymer | — | — | — | — | — |
| SEBS block copolymer | — | — | — | — | — |
| Filler (potassium aluminum silicate) | | | | | |
| Filler (carbon black) | | | | | |
| Flame retardant (aluminum hydroxide) | | | | | |
| Lubricant (calcium stearate) | | | | | |
| Stabilizer | | | | | |

| Parts in | Styrene | Acrylonitrile | Rubber content | Gel content | Carbon monoxide | Vinyl acetate |
|---|---|---|---|---|---|---|
| Ethylene-propylene-dicyclopentadiene (A) | — | — | — | — | — | — |
| Random polypropylene copolymer (A1) | — | — | — | — | — | — |
| Random polyethylene copolymer (A3) | — | — | — | — | — | — |
| Thermoplastic Elastomer (TPE)-1(A5) | — | — | 53 | 75 | — | — |
| Thermoplastic Elastomer (TPE)-2(A6) | — | — | 56 | 88 | — | — |
| Random polyethylene copolymer (A4) | — | — | — | — | — | — |
| Homo-polypropylene | — | — | — | — | — | — |
| Butyl acrylate modif. SAN | 40 | 15 | 45 | — | — | — |
| EPDM-rubber modified SAN | 21 | 9 | 70 | — | — | — |
| EVA-carbon monoxide terpolymer | — | — | — | — | 12 | 24 |
| SEP block copolymer | 29 | — | 71 | — | — | — |
| SEBS block copolymer | 29 | — | 71 | — | — | — |
| Filler (potassium aluminum silicate) | | | | | | |
| Filler (carbon black) | | | | | | |
| Flame retardant (aluminum hydroxide) | | | | | | |
| Lubricant (calcium stearate) | | | | | | |
| Stabilizer | | | | | | |

Note:
Gel content = degree of crosslinking of the EPDM rubber in the TPE (DIN 16892).

What is claimed is:

1. A molded article which is prepared by calendering or extruding a thermoplastic elastomer which comprises a blend of:
   (a) about 70 to 30 parts by weight of a partially crystalline, random terpolymer consisting of ethylene, propylene, and a diene, wherein the terpolymer is crosslinked to a degree of about 70 to 95% and wherein the total weight percent of ethylene and propylene in the terpolymer is about 52 to 91%;
   (b) about 30 to 70 parts by weight of a polymer selected from the group consisting of polyethylene, polypropylene, a copolymer consisting of ethylene with propylene, butene, or octene, and mixtures thereof; and
   (c) at least about 5 weight % of an amorphous polymeric modifying agent, a partially crystalline polymeric modifying agent having a degree of crystallinity of up to about 25%, or mixtures thereof, the modifying agent being selected from the group consisting of an acrylonitrile-styrene-acrylic acid ester terpolymer, an acrylonitrile-butadiene-styrene terpolymer, an ethylene-vinyl acetate-carbon monoxide terpolymer, a polyurethane, a polycaprolactone, and mixtures thereof, which modifying agent hinders or prevents the tendency of the thermoplastic elastomer in the molded article to crystallize.

2. The molded article according to claim 1, wherein the polymer of (b) is the ethylene copolymer with propylene and wherein the thermoplastic elastomer contains approximately 60 to 30 parts by weight of the ethylene-propylene-diene terpolymer of (a) per 40 to 70 parts by weight of the ethylene-propylene copolymer of (b).

3. The molded article according to claim 1, wherein the random terpolymer of (a) consists of at least about 65 wt. % of ethylene.

4. The molded article according to claim 1, wherein polymer of (b) is the ethylene copolymer with propylene and the ethylene-propylene copolymer contains about 5 to 20 wt % ethylene.

5. The molded article according to claim 1, wherein the polymer of (b) is the polypropylene or the ethylene copolymer with propylene and the polypropylene or the ethylene-propylene copolymer has a narrow molecular-weight distribution with a nonuniformity U of less than about 6.

6. The molded article according to claim 1, wherein the polymer of (b) is the ethylene copolymer with octene or butene and wherein the octene or butene is about 5 to 20 wt %.

7. The molded article of claim 1, wherein the modifying agent has a degree of crystallinity of about 5 to 25%.

8. The molded article according to claim 1, further comprising a stabilizer, a filler, a lubricant, a colorant, a flame retardant.

9. The molded article according to claim 8, wherein one or more fillers are present in an amount of about 8 to 28% by weight.

10. The molded article according to claim 9, wherein the filler is selected from the group consisting of potassium aluminum silicate, talc, chalk, kaolin, a metal oxide, carbon black and mixtures thereof.

11. A molded article which is prepared by calendering or extruding a thermoplastic elastomer which consists essentially of a blend of:
    (a) about 70 to 30 parts by weight of a partially crystalline, random terpolymer consisting of ethylene, propylene, and a diene, wherein the terpolymer is crosslinked to a degree of about 70 to 95% and wherein the total weight percent of ethylene and propylene in the terpolymer is about 52 to 91%;
    (b) about 30 to 70 parts by weight of a polymer selected from the group consisting of polyethylene, polypropylene, a copolymer consisting of ethylene with propylene, butene, or octene, and mixtures thereof; and
    (c) at least about 5 weight % of an amorphous polymeric modifying agent and/or a partially crystalline amorphous polymeric modifying agent having a degree of crystallinity of up to about 25%, the modifying agent being an acrylonitrile-styrene-acrylic acid ester terpolymer, an acrylonitrile-styrene-butadiene terpolymer, an ethylene-vinyl acetate-carbon monoxide terpolymer, a polyurethane, a polycaprolactone, or mixtures thereof.

12. The molded article of claim 1, wherein the modifying agent is the acrylonitrile-styrene-acrylic ester terpolymer, an acrylonitrile-butadiene-styrene terpolymer, or mixtures thereof.

13. The molded article of claim 12, wherein the modifying agent is the acrylonitrile-styrene-acrylic acid ester terpolymer.

14. The molded article of claim 11, wherein the modifying agent is the acrylonitrile-styrene-acrylic acid ester terpolymer, an acrylonitrile-butadiene-styrene terpolymer, or mixtures thereof.

15. The molded article of claim 14, wherein the modifying agent is the acrylonitrile-styrene-acrylic acid ester terpolymer.

* * * * *